(12) United States Patent
Zhou et al.

(10) Patent No.: US 9,096,792 B2
(45) Date of Patent: Aug. 4, 2015

(54) LUMINESCENT ELEMENT INCLUDING NITRIDE, PREPARATION METHOD THEREOF AND LUMINESCENCE METHOD

(75) Inventors: Mingjie Zhou, Guangdong (CN); Wenbo Ma, Guangdong (CN); Jing Tang, Guangdong (CN)

(73) Assignee: Ocean's King Lighting Science & Technology CO., LTD., Guangdong (CN)

( * ) Notice: Subject to any disclaimer, the term of this patent is extended or adjusted under 35 U.S.C. 154(b) by 799 days.

(21) Appl. No.: 13/392,449

(22) PCT Filed: Aug. 26, 2009

(86) PCT No.: PCT/CN2009/073522
§ 371 (c)(1),
(2), (4) Date: Feb. 24, 2012

(87) PCT Pub. No.: WO2011/022881
PCT Pub. Date: Mar. 3, 2011

(65) Prior Publication Data
US 2012/0146502 A1    Jun. 14, 2012

(51) Int. Cl.
*H01J 23/34*    (2006.01)
*C09K 11/08*    (2006.01)
(Continued)

(52) U.S. Cl.
CPC ......... *C09K 11/0883* (2013.01); *C09K 11/7706* (2013.01); *C09K 11/7721* (2013.01); *C09K 11/7734* (2013.01); *C09K 11/7749* (2013.01); *C09K 11/7764* (2013.01); *H01J 63/04* (2013.01); *H01J 63/06* (2013.01); *H05B 33/145* (2013.01);
(Continued)

(58) Field of Classification Search
USPC ................ 315/1; 313/483, 503, 493; 445/58; 428/450, 433, 336; 257/98; 252/301.4 F, 301.6 F
See application file for complete search history.

(56) References Cited

U.S. PATENT DOCUMENTS 5,122,671 A    6/1992    Buchanan et al.
5,779,825 A    7/1998    Moon
(Continued)

FOREIGN PATENT DOCUMENTS

CN    1270381 A    10/2000
CN    1270382 A    10/2000
(Continued)

OTHER PUBLICATIONS

Office Action received for Chinese Patent Application No. 200980161089.7, mailed on Jun. 18, 2014, 4 pages.
(Continued)

*Primary Examiner* — Lincoln Donovan
*Assistant Examiner* — Thomas Skibinski
(74) *Attorney, Agent, or Firm* — Morrison & Foerster LLP

(57) ABSTRACT

A luminescent element including nitride includes a luminescent film and a metal layer with a metal microstructure formed on a surface of the luminescent film; wherein the luminescent film has a chemical composition: $Ga_{1-x}Al_xN$:yRe, wherein Re represents the rare earth element, $0 \leq x \leq 1$, $0 < y \leq 0.2$. A preparation method of a luminescent element including nitride and a luminescence method are also provided. The metal layer is formed on the surface of the luminescent film, and the luminescent element including nitride has simple structure, good luminescence homogeneity, high luminescence efficiency, and good luminescence stability.

3 Claims, 5 Drawing Sheets

(51) Int. Cl.
  *C09K 11/77* (2006.01)
  *H01J 63/04* (2006.01)
  *H01J 63/06* (2006.01)
  *H05B 33/14* (2006.01)
(52) U.S. Cl.
  CPC .......... *H01J 2329/20* (2013.01); *Y10T 428/265* (2015.01); *Y10T 428/31678* (2015.04)

(56) References Cited

U.S. PATENT DOCUMENTS

| | | | |
|---|---|---|---|
| 5,788,881 A | 8/1998 | Chadha et al. | |
| 5,851,317 A * | 12/1998 | Biner et al. | 148/403 |
| 6,465,946 B1 | 10/2002 | Yoon et al. | |
| 6,504,297 B1 | 1/2003 | Heo et al. | |
| 7,229,675 B1 | 6/2007 | Paderov et al. | |
| 7,423,368 B2 | 9/2008 | Miyamae et al. | |
| 7,799,444 B2 | 9/2010 | Peuchert et al. | |
| 2001/0048966 A1 | 12/2001 | Trumble et al. | |
| 2002/0158569 A1* | 10/2002 | Wakahara et al. | 313/495 |
| 2005/0146724 A1 | 7/2005 | Malak | |
| 2006/0181196 A1 | 8/2006 | Peuchert et al. | |
| 2006/0192213 A1 | 8/2006 | Ohwada et al. | |
| 2007/0013300 A1 | 1/2007 | Takahashi et al. | |
| 2007/0059901 A1* | 3/2007 | Majumdar et al. | 438/455 |
| 2007/0090748 A1 | 4/2007 | Sasaguri | |
| 2007/0262699 A1 | 11/2007 | Takahashi et al. | |
| 2007/0290602 A1 | 12/2007 | Hosotani et al. | |
| 2009/0051268 A1 | 2/2009 | You et al. | |
| 2009/0117260 A1 | 5/2009 | Ishii et al. | |
| 2009/0135339 A1 | 5/2009 | You et al. | |
| 2012/0146499 A1 | 6/2012 | Zhou et al. | |
| 2012/0146500 A1 | 6/2012 | Zhou et al. | |
| 2012/0146501 A1 | 6/2012 | Zhou et al. | |
| 2012/0153821 A1 | 6/2012 | Zhou et al. | |

FOREIGN PATENT DOCUMENTS

| | | |
|---|---|---|
| CN | 1632052 A | 6/2005 |
| CN | 1745450 A | 3/2006 |
| CN | 1754408 A | 3/2006 |
| CN | 1769231 A | 5/2006 |
| CN | 1805105 A | 7/2006 |
| CN | 1962932 A | 5/2007 |
| CN | 101071751 A | 11/2007 |
| CN | 101442089 A | 5/2009 |
| EP | 0062993 A1 | 10/1982 |
| EP | 0992463 A1 | 4/2000 |
| EP | 1246262 A2 | 10/2002 |
| EP | 1589555 A1 | 10/2005 |
| EP | 1642869 A1 | 4/2006 |
| EP | 1695946 A2 | 8/2006 |
| GB | 2000173 A | 1/1979 |
| JP | 1-149888 A | 6/1989 |
| JP | 2-18841 A | 1/1990 |
| JP | 5-89800 A | 4/1993 |
| JP | 2000-109823 A | 4/2000 |
| JP | 2000-159543 A | 6/2000 |
| JP | 2000-290646 A | 10/2000 |
| JP | 2002-141000 A | 5/2002 |
| JP | 2004-88011 A | 3/2004 |
| JP | 2005-11701 A | 1/2005 |
| JP | 2005-54182 A | 3/2005 |
| JP | 2007-103052 A | 4/2007 |
| JP | 2007-153626 A | 6/2007 |
| WO | 03/058728 A1 | 7/2003 |

OTHER PUBLICATIONS

Office Action received for Chinese Patent Application No. 200980161090.X, mailed on Apr. 8, 2014, 5 pages.
Extended European Search Report (includes Supplementary European Search Report and Search Opinion) received for European Patent Application No. 09848611.1, mailed on Jun. 2, 2014, 11 pages.
Extended European Search Report (includes Supplementary European Search Report and Search Opinion) received for European Patent Application No. 09848612.9, mailed on Jun. 18, 2014, 10 pages.
Extended European Search Report (includes Supplementary European Search Report and Search Opinion) received for European Patent Application No. 09848613.7, mailed on Jun. 17, 2014, 8 pages.
Structure, Properties and Applications of Borate Glasses, Glass technology, Society of Glass Technology, Sheffield, GB, vol. 41, No. 6, Dec. 1, 2000, pp. 182-185.
Sohn et al., "Luminescence of Pulsed Laser Deposited Y2SiO5:Tb3+ Thin Film Phosphors on Fiat and Corrugated Quartz Glass Substrates", Japanese Journal of Applied Physics, vol. 44, No. 4A, 2005, pp. 1787-1791.
Extended European Search Report and Search Opinion received for EP Patent Application No. 09848608.7, mailed on May 17, 2013, 7 pages.
Extended European Search Report and Search Opinion received for EP Patent Application No. 09848610.3, mailed on Dec. 17, 2012, 4 pages.
Office Action received for European Patent Application No. 09848608.7, mailed on Sep. 9, 2013, 5 pages.
International Preliminary Report on Patentability received for PCT Patent Application No. PCT/CN2009/073515, mailed on Mar. 8, 2012, 8 pages (5 pages of English Translation and 3 pages of IPRP).
International Search Report received for PCT Patent Application No. PCT/CN2009/073515, mailed on Jun. 3, 2010, 8 pages (4 pages of English Translation and 4 pages of PCT Search Report).
International Search Report received for PCT Patent Application No. PCT/CN2009/073517, mailed on Jun. 3, 2010, 10 pages (5 pages of English Translation and 5 pages of PCT Search Report).
International Search Report received for PCT Patent Application No. PCT/CN2009/073520, mailed on Jun. 3, 2010, 10 pages (5 pages of English Translation and 5 pages of Search Report).
International Search Report received for PCT Patent Application No. PCT/CN2009/073522, mailed on Jan. 14, 2010, 8 pages (4 pages of English Translation and 4 pages of Search Report).
Hong et al., "Comparison of Dynamics of Eu3+ in Different Y2O3 Nanostructured Materials and with Sol-Gel Produced SiO2 Glass", Journal of Luminescence, vol. 83-84, 1999, pp. 393-398.
Psuja et al., "Fabrication, Luminescent Properties and Possible Photonics Application of Eu:Y2 O3 Nanoparticles", 2008 International Students and Young Scientists Workshop "Photonics and Microsystems", Jun. 20-22, 2008, pp. 68-72.
Yi et al., "Enhanced Luminescence of Pulsed-Laser-Deposited Y2O3:Eu3+ Thin-Film Phosphors by Li Doping", Applied Physics Letters, vol. 81, No. 18, Oct. 28, 2002, pp. 3344-3346.
Aisaka et al., "Enhancement of Upconversion Luminescence of Er Doped AL2O3 Films by Ag Island Films", Applied Physics Letters, vol. 92, 2008, pp. 132105-1-132105-3.
Office Action received for Japanese Patent Application No. 2012-525839, mailed on May 7, 2013, 3 pages. See Statement Under 37 CFR § 1.98(a) (3).
Office Action received for Japanese Patent Application No. 2012-525840, mailed on Sep. 3, 2013, 3 pages. See Statement Under 37 CFR § 1.98(a) (3).
Office Action received for Japanese Patent Application No. 2012-525835, mailed on Dec. 3, 2013, 3 pages of Official Copy Only. See Statement Under 37 CFR § 1.98(a) (3).
Office Action received for Japanese Patent Application No. 2012-525837, mailed on Dec. 3, 2013, 3 pages of Official copy only. See Statement Under 37 CFR § 1.98(a) (3).
Office Action received for Chinese Patent Application No. 200980161087.8, issued on Aug. 14, 2013, 4 pages of Official Copy Only. See Statement Under 37 CFR § 1.98(a) (3).
Office Action received for Chinese Patent Application No. 200980161088.2, issued on Aug. 27, 2013, 5 pages of Official Copy Only. See Statement Under 37 CFR § 1.98(a) (3).
Office Action received for Chinese Patent Application No. 200980161086.3, mailed on Aug. 2, 2013, 4 pages of Official copy only. See Statement Under 37 CFR § 1.98(a) (3).

(56) References Cited

OTHER PUBLICATIONS

Office Action received for Chinese Patent Application No. 200980161090.X, issued on Sep. 29, 2013, 7 pages of Official Copy Only. See Statement Under 37 CFR § 1.98(a) (3).
Office Action received for Japanese Patent Application No. 2012-525838, mailed on Sep. 17, 2013, 4 pages Official Copy only. See Statement Under 37 CFR § 1.98(a) (3).
International Preliminary Report on Patentability received for PCT Patent Application No. PCT/CN2009/073522, mailed on Mar. 8, 2012, 10 pages (6 pages of English Translation and 4 pages of IPRP).
International Preliminary Report on Patentability received for PCT Patent Application No. PCT/CN2009/073517, mailed on Mar. 8, 2012, 12 pages (7 pages of English Translation and 5 pages of IPRP).
International Preliminary Report on Patentability received for PCT Patent Application No. PCT/CN2009/073520, mailed on Mar. 8, 2012, 12 pages (7 pages of English Translation and 5 pages of IPRP).
International Preliminary Report on Patentability received for PCT Patent Application No. PCT/CN2009/073518, mailed on Mar. 8, 2012, 12 pages (7 pages of English Translation and 5 pages of IPRP).
International Search Report received for PCT Patent Application No. PCT/CN2009/073518, mailed on Jun. 3, 2010, 10 pages (5 pages of English Translation and 5 Pages of PCT Search Report).
Nagakura, Shigeru, "Metal Back Plate Fluorescence", Crystallographic Society of Japan Journal, vol. 23, 1981, pp. 299-301. See Statement Under 37 CFR § 1.98(a) (3).
Non-Final Office Action received for U.S. Appl. No. 13/392,384, mailed on Dec. 24, 2014, 10 pages.
Non-Final Office Action received for U.S. Appl. No. 13/392,398, mailed on Dec. 24, 2014, 8 pages.
Non-Final Office Action received for U.S. Appl. No. 13/392,407, mailed on Dec. 26, 2014, 9 pages.
Non-Final Office Action received for U.S. Appl. No. 13/392,420, mailed on Dec. 31, 2014, 10 pages.

* cited by examiner

LUMINESCENT ELEMENT INCLUDING NITRIDE, PREPARATION METHOD THEREOF AND LUMINESCENCE METHOD

CROSS REFERENCE TO RELATED APPLICATIONS

This application is a national stage of International Patent Application Serial No. PCT/CN2009/073522, filed Aug. 26, 2009, which is hereby incorporated by reference in the present disclosure in its entirety.

FIELD OF THE INVENTION

The present disclosure relates to luminescent materials, and more particularly relates to a luminescent element including a glass substrate made of luminescent material, preparation method thereof and luminescence method.

BACKGROUND OF THE INVENTION

The conventional materials used as luminescent substrate include phosphor, nanocrystal, glass, etc. Comparing to the crystal and phosphor, the glass is transparent, rigid, and has excellent chemical stability and superior luminescent performance. In addition, the glass can be easily machined into products with various shapes, such as display devices or luminescent light sources with various shapes and sizes.

For example, in vacuum microelectronics, field emission devices usually use luminescent glass as illuminant, which has shown a wide prospect in illumination and display techniques and draws a lot attention to domestic and foreign research institutes. The working principle of the field emission device is that, in vacuum, the anode applies a positive voltage to the field emissive arrays (FEAs) to form an accelerating electric field, electron emitted from the cathode accelerately bombards the luminescent material on the anode plate to irradiate. The field emission device has a wide operating temperature range (−40° C.~80° C.), short corresponding time (<1 ms), simple structure, low energy consumption, and meets the environmental protection requirements. Furthermore, materials such as the phosphor, luminescent glass, luminescent film, etc., can be served as luminescent material in field emission device, however, they all suffer from serious problems of low luminous efficiency, thus significantly limit the application of the field emission device, especially in the application of illumination.

SUMMARY OF THE INVENTION

In one aspect of the present disclosure, a luminescent element including nitride with a high luminescent homogeneity, high luminous efficiency, good stability, simple structure and a preparation method with a simple processes and low cost are desired.

In another aspect of the present disclosure, a luminescence method of the luminescent element including nitride with simple operation, good reliability, and improving luminous efficiency is also desired.

A luminescent element including nitride includes: a luminescent substrate; and a metal layer with a metal microstructure formed on a surface of the luminescent substrate; wherein the luminescent substrate has a chemical composition: $Ga_{1-x}Al_xN:yRe$, wherein Re represents the rare earth element, $0 \leq x \leq 1$, $0 < y \leq 0.2$.

A preparation method of a luminescent element including nitride includes: preparing a luminescent substrate comprising a chemical composition: $Ga_{1-x}Al_xN:yRe$, wherein Re represents the rare earth element, $0 \leq x \leq 1$, $0 < y \leq 0.2$; forming a metal layer on the luminescent substrate, and annealing the luminescent substrate and the metal layer in vacuum to form a metal microstructure of the metal layer, and then cooling the luminescent substrate and the metal layer to form the luminescent element including nitride.

A luminescence method of a luminescent element including nitride includes: obtaining the luminescent element including nitride according to the preparation method described above; and emitting cathode-ray to the metal layer, forming a surface plasmon between the metal layer and the luminescent substrate by the radiation of the cathode-ray and then irradiating the luminescent glass.

In the luminescent element including nitride described above, the metal layer with a metal microstructure is formed on a surface of the luminescent substrate, and irradiated by the cathode-ray, a surface plasmon can be formed between the metal layer and the luminescent substrate. Due to the surface plasmon effect, the internal quantum efficiency of the luminescent substrate is highly increased, and the spontaneous emission of the luminescent substrate is highly increased, so that the luminous efficiency of the luminescent substrate is improved and the low efficiency problem of the luminescent materials is overcome. Accordingly, in the luminescence method of the luminescent element including nitride, once emitting cathode-ray to the metal layer, the surface plasmon will be formed between the metal layer and the luminescent substrate, thus improving the luminous efficiency and reliability. The luminescent element including nitride has a simple two-layer structure for including the luminescent substrate and the metal layer. In addition, there is a uniform interface formed between the luminescent substrate and the metal layer, so that an excellent luminescent homogeneity and stability is achieved. In the luminescence method of the luminescent element including nitride, once emitting cathode-ray to the metal layer, the surface plasmon will be formed between the metal layer and the luminescent substrate, thus improving the luminous efficiency and reliability of the luminescent substrate.

In the embodiment of the preparation method of the luminescent element including nitride, the luminescent element including nitride can be obtained by forming a metal layer on the luminescent glass and annealing the luminescent glass and the metal layer, thus the preparation method is simple and has a low cost. The luminescent element including nitride can be widely applied to luminescent devices with ultra-high brightness and high-speed motion, such as field emission display.

BRIEF DESCRIPTION OF THE DRAWINGS

The components in the drawings are not necessarily drawn to scale, the emphasis instead being placed upon clearly illustrating the principles of the present disclosure.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
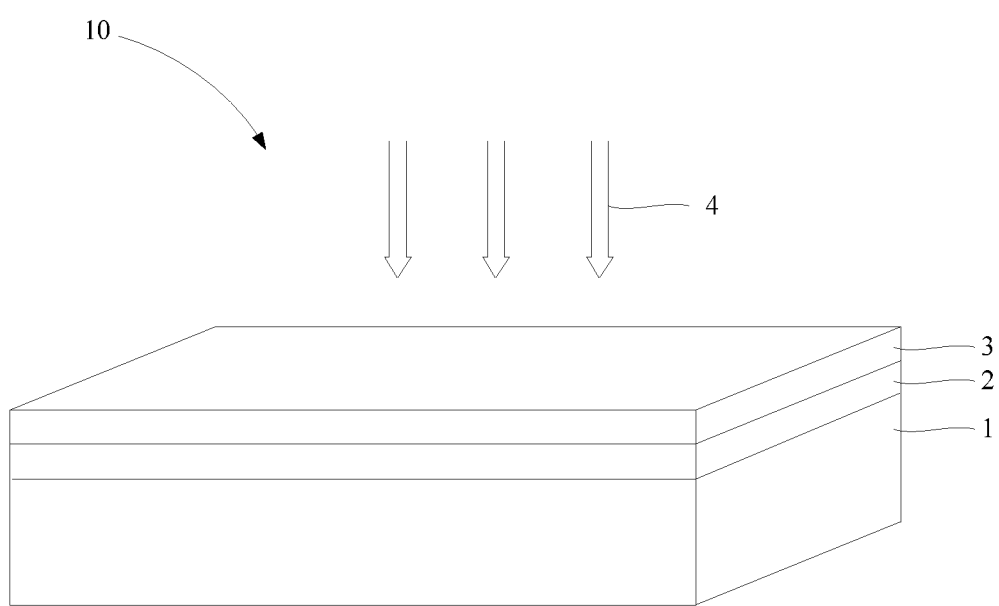
FIG. 1 is a schematic, side view of a luminescent element including nitride according to an embodiment of the present disclosure.

Referring to FIG. 1, an embodiment of a luminescent element including nitride 10 includes a luminescent film 2 and a metal layer 3 formed on a surface of the luminescent film 2. The luminescent file 2 is disposed on a substrate 1, and is located between the substrate 1 and the metal layer 3. The substrate 1 may be transparent substrate or translucent substrate made of quartz, sapphire, magnesium oxide, et al. The metal layer 3 has a metal microstructure, which may be called as micro-nano structure. In addition, the metal microstructure is aperiodic, i.e. composed of metal crystal in irregular arrangement.

The luminescent film 2 has a chemical composition: $Ga_{1-x}Al_xN:yRe$, wherein Re represents the rare earth element, $0 \le x \le 1$, $0 < y \le 0.2$. Re preferably represents at least one element selected from the group consisting of Gd, Ce, Tm, Eu, Tb, Sm, Dy, Er, and Pr. The luminescence property of the luminescent film 2 is significant improved by adulterating the rare earth element which has excellent luminescence properties. In addition, the luminescent film 2 further has high light transmission property.

The metal layer 3 may be made of metals with excellent chemical stability, such as antioxidant and corrosion-resistant metals, or common metals. The metal layer 3 is preferably made of at least one metal selected from the group consisting of Au, Ag, Al, Cu, Ti, Fe, Ni, Co, Cr, Pt, Pd, Mg, and Zn, or more preferably made of at least one metal selected from the group consisting of Au, Ag, and Al. The metal layer 3 may be made of one metal or a composite metal. The composite metal may be an alloy of two or more than two metals described above. For example, the metal layer 3 may be an Ag/Al alloy layer or an Au/Al alloy layer, where the weight percent of Ag or Au is preferably more than 70%. The metal layer 3 has a thickness in a range of 0.5~200 nm, preferably 1~100 nm.

As a luminescent element including nitride, the luminescent element including nitride 10 can be widely applied to luminescent devices with ultra-high brightness and high-speed motion, such as field emission display, field emission light source, and large advertising display, etc. Take field emission display as an example, as shown in FIG. 1, the anode (not shown) applies a positive voltage to the field emission cathode to form an accelerating electric field, the cathode emits cathode-ray 4, i.e. electron to the metal layer 3, so that a surface plasmon is formed between the metal layer 3 with the metal microstructure and the luminescent film 2. Due to the surface plasmon effect, the internal quantum efficiency of the luminescent film 2 is highly increased, and the spontaneous emission of the luminescent glass is highly increased, so that the luminous efficiency of the luminescent film is improved and the low efficiency problem of the luminescent film is overcome. In addition, since a metal layer 3 is formed on the surface of the luminescent film 2, a uniform interface is formed between the whole metal layer and the luminescent film 2, thus improving the luminescent homogeneity.

Figure 2:
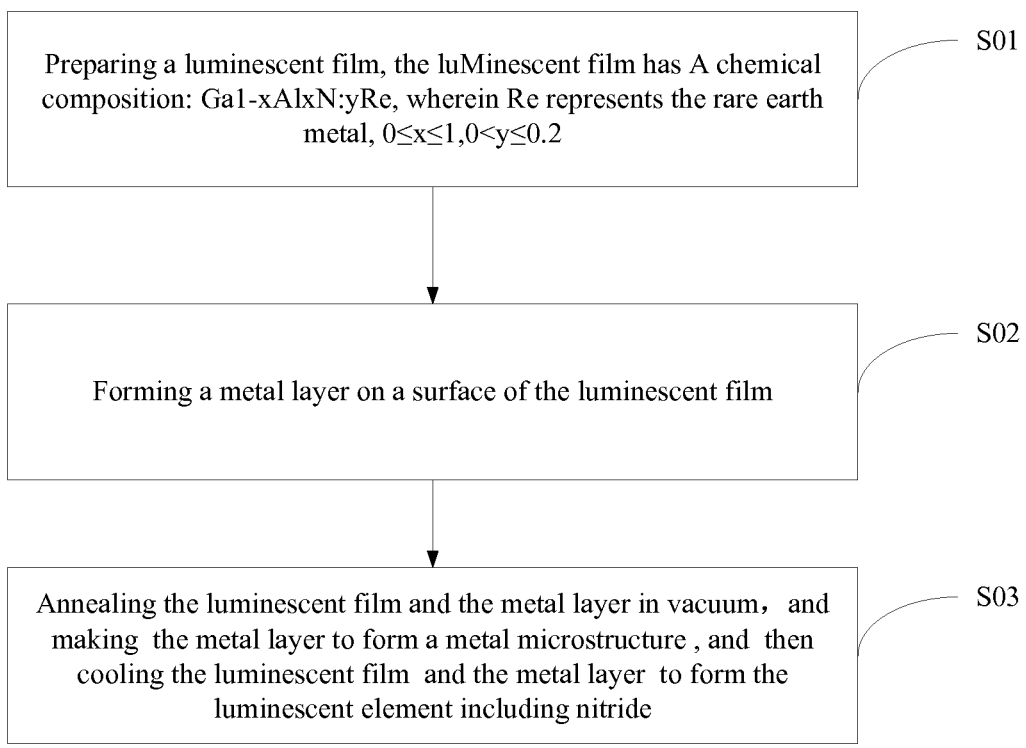
FIG. 2 is a flow chart of an embodiment of a preparation method of a luminescent element including nitride.

Referring to FIG. 1 and FIG. 2, a flow chart of an embodiment of a preparation method of a luminescent element including nitride is shown and includes following steps:

Step S01, the luminescent film 2 is prepared, the luminescent film 2 has a chemical composition: $Ga_{1-x}Al_xN:yRe$, wherein Re represents the rare earth element, $0 \le x \le 1$, $0 < y \le 0.2$.

Step S02, the metal layer 3 is formed on a surface of the luminescent film 2.

Step S03, the luminescent film 2 and the metal layer 3 are annealed in vacuum to form the metal microstructure of the metal layer 3, and then the luminescent luminescent film 2 and the metal layer 3 are cooled to form the luminescent element including nitride 10.

Wherein, the preparation of the luminescent film 2 includes: selecting an appropriate substrate 1, and polishing double sides of the substrate 1, then forming a film on a surface of the substrate 1, the film has a chemical composition: $Ga_{1-x}Al_xN:yRe$, wherein Re represents the rare earth element, $0 \le x \le 1$, $0 < y \le 0.2$. The film is formed on the surface of the substrate 1 by one method selected from the group consisting of magnetron sputtering, electron beam evaporating, chemical vapor deposition, molecular beam epitaxy, pulsed laser deposition, and spray pyrolysis process. The substrate 1 may be transparent substrate or translucent substrate made of quartz, sapphire, magnesium oxide, et al., as previously described. The Re may preferably be at least one element selected from the group consisting of Gd, Ce, Tm, Eu, Tb, Sm, Dy, Er, and Pr. In addition, the substrate 1 with the luminescent film 2 may be cut, and polished to certain size, thereby the luminescent film of needed size is obtained.

In step S02, the metal layer 3 is formed on the surface of the luminescent film by sputtering or evaporative depositing metal. As previously described, the metal layer 3 is formed by depositing metal source with excellent chemical stability, such as antioxidant and corrosion-resistant metals, or common metals. The metal layer 3 is preferably made of at least one metal selected from the group consisting of Au, Ag, Al, Cu, Ti, Fe, Ni, Co, Cr, Pt, Pd, Mg, and Zn, or more preferably made of at least one metal selected from the group consisting of Au, Ag, and Al. The metal layer 3 may be made of an alloy of metals described above. The metal layer 3 has a thickness in a range of 0.5~200 nm, preferably 1~100 nm.

In step S03, after the formation of the metal layer 3 on the luminescent film 2, the metal layer 3 and the luminescent film 2 are vacuum annealed at a temperature in a range of 50~650° C. for 5 minutes to 5 hours and cooled to ambient temperature. The preferred anneal temperature is in a range of 100~600° C., and the preferred anneal time is in a range of 15~180 minutes, the vacuum degree is less than $1 \times 10^{-3}$ Pa.

Figure 3:
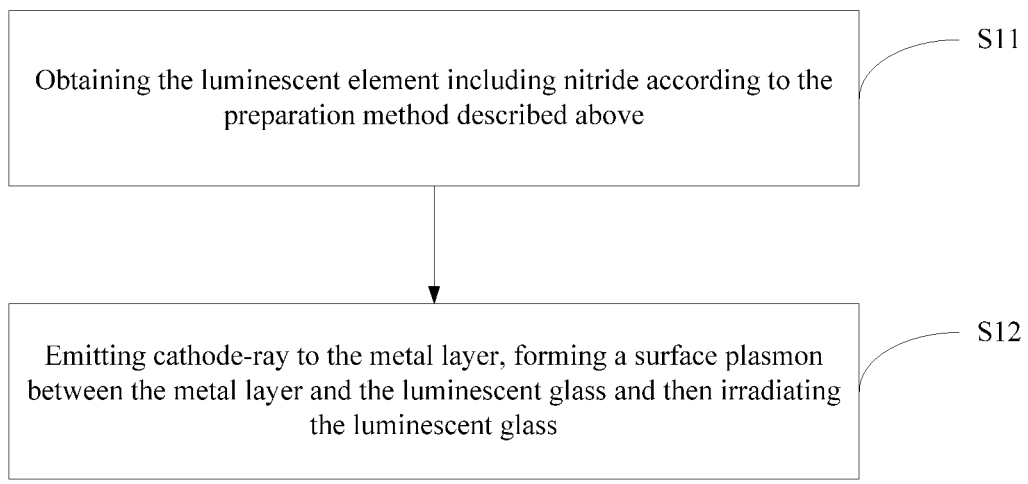
FIG. 3 is a flow chart of an embodiment of a luminescence method of a luminescent element including nitride.

Referring to FIG. 1 and FIG. 3, a flow chart of a luminescence method of the luminescent element including nitride is shown and includes following steps:

Step S11, the luminescent element including nitride 10 is obtained according to the previously described preparation method.

Step S12, cathode-ray 4 is emitted to the metal layer 3. A surface plasmon is formed between the metal layer 3 and the luminescent film 2 by the radiation of the cathode-ray 16 and thus irradiating the luminescent film 2.

The luminescent element including nitride 10 is obtained by the method described previously, and has features of structure and composition as previously described. In application, for example, the luminescent element including nitride 10 is implemented by field emission display or illumination light source. In vacuum, the anode applies a positive voltage to the field emission cathode to form an accelerating electric field, so that the cathode emits cathode-ray 4. Excited by the cathode-ray 4, electron beam will penetrate the metal layer 3 and irradiate the luminescent film 2. During such process, a surface plasmon is formed between the metal layer 3 and the luminescent film 2. Due to the surface plasmon effect, the internal quantum efficiency of the luminescent film 2 is highly increased, and the spontaneous emission of the luminescent film 2 is highly increased, so that the luminous efficiency of the luminescent film 2 is improved.

Surface plasmon (SP) is a wave spread along the interface between the metal and medium, and amplitude of the wave is exponentially decayed with the increase of the distance away from the interface. When changing a surface structure of the metal, the feature, dispersion relationship, excitation mode, coupling effect of the surface plasmon polaritons (SPPs) will be significantly changed. The electromagnetic field caused by the SPPs can not only constrain the spread of the light wave in sub-wavelength size structure, but also can produce and manipulate the electromagnetic radiation from light frequency to microwave band, thus active manipulation of the light spread is implemented. Accordingly, the present embodiment uses the excitation of the SPPs to increase the optical density of the luminescent film 2 and to enhance spontaneous emission velocity of the luminescent film 2. In addition, the coupling effect of the surface plasmon can be used, when the luminescent film 2 irradiates, sympathetic vibration phenomena occurs, thus the internal quantum efficiency of the luminescent film 2 is highly increased, so that the luminous efficiency of the luminescent film 2 is improved.

A plurality of examples are described to illustrate the different compositions and preparation methods of the luminescent element including nitride, and their performances.

Example 1

Figure 4:
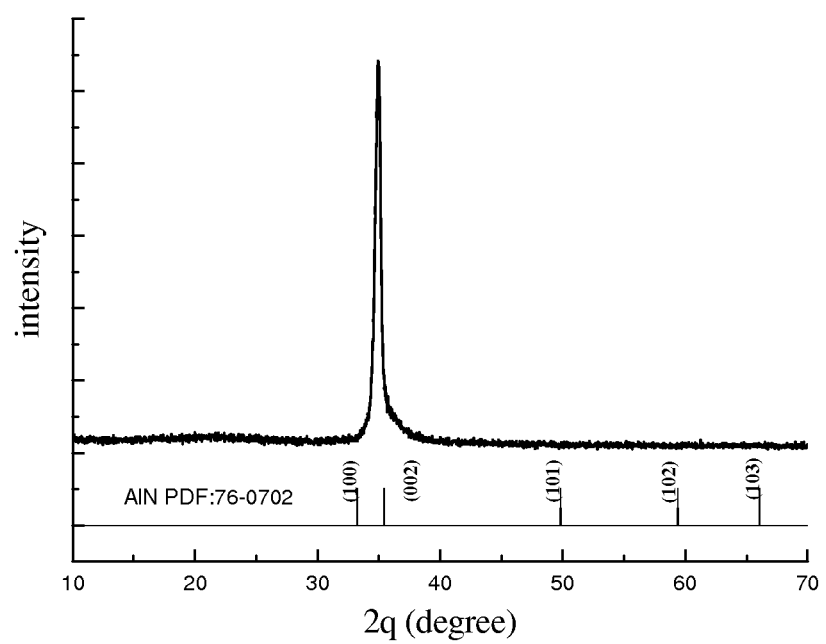
FIG. 4 is X-ray Diffraction spectrum of the luminescent element including nitride of Example 1.

A 1×1 cm$^2$, double-side polished substrate made of quartz is selected, then a luminescent film is formed on a surface of the substrate by magnetron sputtering, and the luminescent film has the composition of AlN:0.005Tm. The luminescent film is test by XRD, and the test result is shown in FIG. 4. In FIG. 4, the film exhibits (002) preferential growth, and crystallographic orientation of aluminum nitride is obtained. A silver layer with a thickness of 2 nm is deposited on a surface of the luminescent film via a magnetron sputtering equipment. The substrate, the luminescent film, and the silver layer are annealed at a temperature of 300° C. for half an hour in vacuum with the vacuum degree <1×10$^{-3}$ Pa and cooled to ambient temperature, thus a luminescent element including nitride is obtained. Structure of the luminescent element including nitride doped the rare earth element shown in FIG. 1, wherein the substrate 1 is made of quartz, the luminescent film 2 has the composition of AlN:0.005Tm prepared, the metal layer is a silver layer with a thickness of 2 nm. Cathode-ray from an electron gun penetrates the metal layer directly, the electron beam will penetrate the metal layer 3 firstly and irradiate the luminescent film 2.

Figure 5:
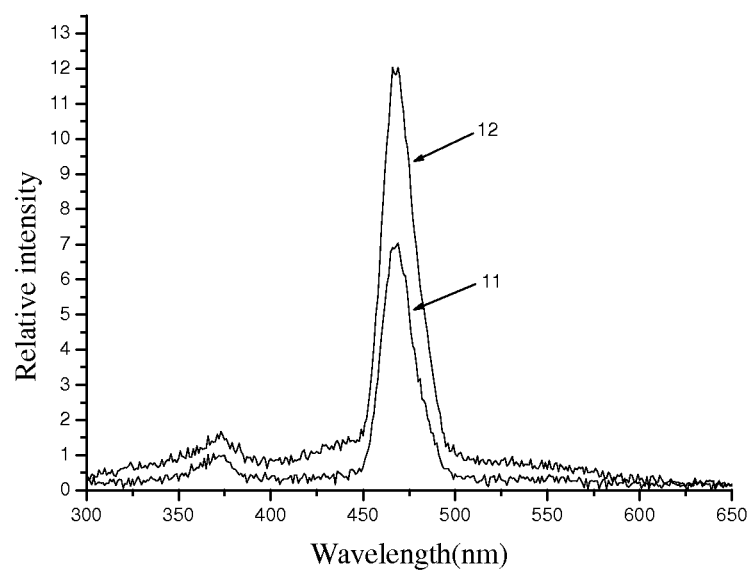
FIG. 5 is an emission spectrum of the luminescent element including nitride of Example 1 comparing with the luminescent film without the metal layer, test condition of the cathode-ray emission spectrum is: electron beam being excited by 5 KV accelerating voltage.

The prepared luminescent element including nitride doped the rare earth element is bombarded by cathode-ray from an electron gun, thus an emission spectrum shown in FIG. 5 is obtained. In FIG. 5, curve 11 represents an emission spectrum of a film without the metal layer; curve 12 represents an emission spectrum of the luminescent element including nitride doped the rare earth element prepared in Example 1. As shown in FIG. 5, since a surface plasmon is formed between the metal layer and the luminescent film, comparing to the luminescent film without the metal layer, the luminescent element including nitride with the metal layer of Example 1 has a luminescence integral intensity 1.87 times as that of the luminescent film without the metal layer in a wavelength of 300~650 nm, accordingly, the luminescent performance is greatly improved.

Other Examples have the similar emission spectrums and luminescent performance as Example 1, which will not be described later.

Example 2

A 1×1 cm$^2$, double-side polished substrate made of quartz is selected, then a luminescent film is formed on a surface of the substrate by electron beam evaporating, and the luminescent film has the composition of Ga$_{0.5}$Al$_{0.5}$N:0.2Tb. A golden layer with a thickness of 0.5 nm is deposited on a surface of the luminescent film via a magnetron sputtering equipment. The substrate, the luminescent film, and the golden layer are annealed at a temperature of 200° C. for an hour in vacuum with the vacuum degree <1×10$^{-3}$ Pa and cooled to ambient temperature, thus a luminescent element including nitride is obtained.

Example 3

A 1×1 cm$^2$, double-side polished substrate made of sapphire is selected, then a luminescent film is formed on a surface of the substrate by chemical vapor deposition, and the luminescent film has the composition of Ga$_{0.2}$Al$_{0.8}$N:0.06Gd. A aluminum layer with a thickness of 200 nm is deposited on a surface of the luminescent film via a magnetron sputtering equipment. The substrate, the luminescent film, and the aluminum layer are annealed at a temperature of 500° C. for 5 hours in vacuum with the vacuum degree <1×10$^{-3}$ Pa and cooled to ambient temperature, thus a luminescent element including nitride is obtained.

Example 4

A 1×1 cm$^2$, double-side polished substrate made of sapphire is selected, then a luminescent film is formed on a surface of the substrate by magnetron sputtering, and the luminescent film has the composition of Ga$_{0.8}$Al$_{0.2}$N:0.02Ce. A magnesium layer with a thickness of 100 nm is deposited on a surface of the luminescent film via a electron beam evaporating equipment. The substrate, the luminescent film, and the magnesium layer are annealed at a temperature of 650° C. for 5 minutes in vacuum with the vacuum degree <1×10$^{-3}$ Pa and cooled to ambient temperature, thus a luminescent element including nitride is obtained.

Example 5

A 1×1 cm$^2$, double-side polished substrate made of magnesium oxide is selected, then a luminescent film is formed on a surface of the substrate by molecular beam epitaxy, and the luminescent film has the composition of GaN:0.08Er. A palladium layer with a thickness of 1 nm is deposited on a surface of the luminescent film via a electron beam evaporating equipment. The substrate, the luminescent film, and the palladium layer are annealed at a temperature of 100° C. for 3 hours in vacuum with the vacuum degree <1×10$^{-3}$ Pa and cooled to ambient temperature, thus a luminescent element including nitride is obtained.

Example 6

A 1×1 cm$^2$, double-side polished substrate made of magnesium oxide is selected, then a luminescent film is formed on a surface of the substrate by spray pyrolysis process, and the luminescent film has the composition of GaN:0.15Eu. A platinum layer with a thickness of 1 nm is deposited on a surface of the luminescent film via a electron beam evaporating equipment. The substrate, the luminescent film, and the platinum layer are annealed at a temperature of 450° C. for 15 minutes in vacuum with the vacuum degree $<1\times10^{-3}$ Pa and cooled to ambient temperature, thus a luminescent element including nitride is obtained.

Example 7

A 1×1 cm$^2$, double-side polished substrate made of quartz is selected, then a luminescent film is formed on a surface of the substrate by magnetron sputtering, and the luminescent film has the composition of $Ga_{0.6}Al_{0.4}N:0.05Pr$. A iron layer with a thickness of 20 nm is deposited on a surface of the luminescent film via a electron beam evaporating equipment. The substrate, the luminescent film, and the iron layer are annealed at a temperature of 50° C. for 5 hours in vacuum with the vacuum degree $<1\times10^{-3}$ Pa and cooled to ambient temperature, thus a luminescent element including nitride is obtained.

Example 8

A 1×1 cm$^2$, double-side polished substrate made of quartz is selected, then a luminescent film is formed on a surface of the substrate by magnetron sputtering, and the luminescent film has the composition of $Ga_{0.4}Al_{0.6}N:0.12Sm$. A titanium layer with a thickness of 10 nm is deposited on a surface of the luminescent film via a electron beam evaporating equipment. The substrate, the luminescent film, and the titanium layer are annealed at a temperature of 150° C. for 2 hours in vacuum with the vacuum degree $<1\times10^{-3}$ Pa and cooled to ambient temperature, thus a luminescent element including nitride is obtained.

Example 9

A 1×1 cm$^2$, double-side polished substrate made of quartz is selected, then a luminescent film is formed on a surface of the substrate by magnetron sputtering, and the luminescent film has the composition of $Ga_{0.35}Al_{0.65}N:0.04Dy$. A copper layer with a thickness of 50 nm is deposited on a surface of the luminescent film via a electron beam evaporating equipment. The substrate, the luminescent film, and the copper layer are annealed at a temperature of 200° C. for 2.5 hours in vacuum with the vacuum degree $<1\times10^{-3}$ Pa and cooled to ambient temperature, thus a luminescent element including nitride is obtained.

Example 10

A 1×1 cm$^2$, double-side polished substrate made of quartz is selected, then a luminescent film is formed on a surface of the substrate by magnetron sputtering, and the luminescent film has the composition of $Ga_{0.9}Al_{0.1}N:0.18Tb$. A zinc layer with a thickness of 150 nm is deposited on a surface of the luminescent film via a electron beam evaporating equipment. The substrate, the luminescent film, and the zinc layer are annealed at a temperature of 350° C. for half an hour in vacuum with the vacuum degree $<1\times10^{-3}$ Pa and cooled to ambient temperature, thus a luminescent element including nitride is obtained.

Example 11

A 1×1 cm$^2$, double-side polished substrate made of quartz is selected, then a luminescent film is formed on a surface of the substrate by magnetron sputtering, and the luminescent film has the composition of $Ga_{0.1}Al_{0.9}N:0.09Tb$. A chrome layer with a thickness of 120 nm is deposited on a surface of the luminescent film via a electron beam evaporating equipment. The substrate, the luminescent film, and the chrome layer are annealed at a temperature of 250° C. for 2 hours in vacuum with the vacuum degree $<1\times10^{-3}$ Pa and cooled to ambient temperature, thus a luminescent element including nitride is obtained.

Example 12

A 1×1 cm$^2$, double-side polished substrate made of quartz is selected, then a luminescent film is formed on a surface of the substrate by magnetron sputtering, and the luminescent film has the composition of $Ga_{0.15}Al_{0.85}N:0.09Tb$. A nickel layer with a thickness of 40 nm is deposited on a surface of the luminescent film via a electron beam evaporating equipment. The substrate, the luminescent film, and the nickel layer are annealed at a temperature of 80° C. for 4 hours in vacuum with the vacuum degree $<1\times10^{-3}$ Pa and cooled to ambient temperature, thus a luminescent element including nitride is obtained.

Example 13

A 1×1 cm$^2$, double-side polished substrate made of quartz is selected, then a luminescent film is formed on a surface of the substrate by magnetron sputtering, and the luminescent film has the composition of $Ga_{0.85}Al_{0.15}N:0.09Tb$. A cobalt layer with a thickness of 180 nm is deposited on a surface of the luminescent film via a electron beam evaporating equipment. The substrate, the luminescent film, and the cobalt layer are annealed at a temperature of 400° C. for 1 hours in vacuum with the vacuum degree $<1\times10^{-3}$ Pa and cooled to ambient temperature, thus a luminescent element including nitride is obtained.

Example 14

A 1×1 cm$^2$, double-side polished substrate made of quartz is selected, then a luminescent film is formed on a surface of the substrate by magnetron sputtering, and the luminescent film has the composition of $Ga_{0.75}Al_{0.25}N:0.07Dy$. A silver/aluminum layer with a thickness of 160 nm is deposited on a surface of the luminescent film via a electron beam evaporating equipment. In the silver/aluminum layer, the silver is about 80 weight %, and the aluminum is about 20 weight %. The substrate, the luminescent film, and the silver/aluminum layer are annealed at a temperature of 380° C. for 1.5 hours in vacuum with the vacuum degree $<1\times10^{-3}$ Pa and cooled to ambient temperature, thus a luminescent element including nitride is obtained.

Example 15

A 1×1 cm$^2$, double-side polished substrate made of quartz is selected, then a luminescent film is formed on a surface of the substrate by magnetron sputtering, and the luminescent film has the composition of $Ga_{0.65}Al_{0.35}N:0.10Sm$. A silver/aluminum layer with a thickness of 80 nm is deposited on a surface of the luminescent film via a electron beam evaporating equipment. In the silver/aluminum layer, the silver is about 90 weight %, and the aluminum is about 10 weight %. The substrate, the luminescent film, and the silver/aluminum layer are annealed at a temperature of 180° C. for 2.5 hours in

Example 16

A 1×1 cm², double-side polished substrate made of quartz is selected, then a luminescent film is formed on a surface of the substrate by magnetron sputtering, and the luminescent film has the composition of $Ga_{0.25}Al_{0.75}N:0.14Pr$. A gold/aluminum layer with a thickness of 30 nm is deposited on a surface of the luminescent film via a electron beam evaporating equipment. In the silver/aluminum layer, the gold is about 80 weight %, and the aluminum is about 20 weight %. The substrate, the luminescent film, and the gold/aluminum layer are annealed at a temperature of 280° C. for 2 hours in vacuum with the vacuum degree $<1\times10^{-3}$ Pa and cooled to ambient temperature, thus a luminescent element including nitride is obtained.

Example 17

A 1×1 cm², double-side polished substrate made of quartz is selected, then a luminescent film is formed on a surface of the substrate by magnetron sputtering, and the luminescent film has the composition of $Ga_{0.7}Al_{0.3}N:0.16Sm$. A gold/aluminum layer with a thickness of 25 nm is deposited on a surface of the luminescent film via a electron beam evaporating equipment. In the silver/aluminum layer, the gold is about 90 weight %, and the aluminum is about 10 weight %. The substrate, the luminescent film, and the gold/aluminum layer are annealed at a temperature of 600° C. for 10 minutes in vacuum with the vacuum degree $<1\times10^{-3}$ Pa and cooled to ambient temperature, thus a luminescent element including nitride is obtained.

In examples described above, the metal layer 3 with a metal microstructure is formed on a surface of the luminescent film 2, and irradiated by the cathode-ray, a surface plasmon can be formed between the metal layer 3 and the luminescent film 2. Due to the surface plasmon effect, the internal quantum efficiency of the luminescent film 2 is highly increased, and the spontaneous emission of the luminescent film is highly increased, so that the luminous efficiency of the luminescent film 2 is improved. The luminescent material including nitride is in form of film, and the metal layer 3 is formed on the surface of the luminescent element material including nitride to form a simple two-layer structure. In addition, there is a uniform interface formed between the luminescent film 2 and the metal layer 3, so that an excellent luminescent homogeneity and stability is achieved. In the luminescence method of the luminescent element including nitride, once emitting cathode-ray to the metal layer 3, the surface plasmon will be formed between the metal layer 3 and the luminescent film 2, thus improving the luminous efficiency and reliability of the luminescent film 2.

In the embodiment of the preparation method of the luminescent element including nitride, the luminescent element including nitride can be obtained by forming a metal layer 3 on the luminescent film 2 and annealing the luminescent film and the metal layer, thus the preparation method is simple and has a low cost. The luminescent element including nitride can be widely applied to luminescent devices with ultra-high brightness and high-speed motion, such as field emission display.

Although the invention has been described in language specific to structural features and/or methodological acts, it is to be understood that the invention defined in the appended claims is not necessarily limited to the specific features or acts described. Rather, the specific features and acts are disclosed as sample forms of implementing the claimed invention.

What is claimed is:

1. A luminescence method of a luminescent element including nitride, comprising:
   preparing a luminescent film comprising a chemical composition: $Ga_{1-x}Al_xN:yRe$, wherein Re represents a rare earth element, wherein $0\leq x\leq1$ and $0\leq y\leq0.2$;
   forming a metal layer on a surface the luminescent film;
   annealing the luminescent film and the metal layer in vacuum to form a metal microstructure of the metal layer;
   cooling the luminescent film and the metal layer to form the luminescent element including nitride;
   emitting cathode-ray to the metal layer;
   forming a surface plasmon between the metal layer and the luminescent substrate by the radiation of the cathode-ray; and
   irradiating the luminescent substrate.

2. The luminescence method of claim 1, wherein the luminescent film is formed on a substrate by magnetron sputtering, electron beam evaporating, chemical vapor deposition, molecular beam epitaxy, pulsed laser deposition, or spray pyrolysis process; and wherein the metal layer is formed on the surface of the luminescent film by magnetron sputtering or evaporation.

3. The luminescence method of claim 1, wherein the luminescent film and the metal layer are annealed at a temperature in a range of 50° C.-650° C. for 5 minutes to 5 hours.

* * * * *